UNITED STATES PATENT OFFICE.

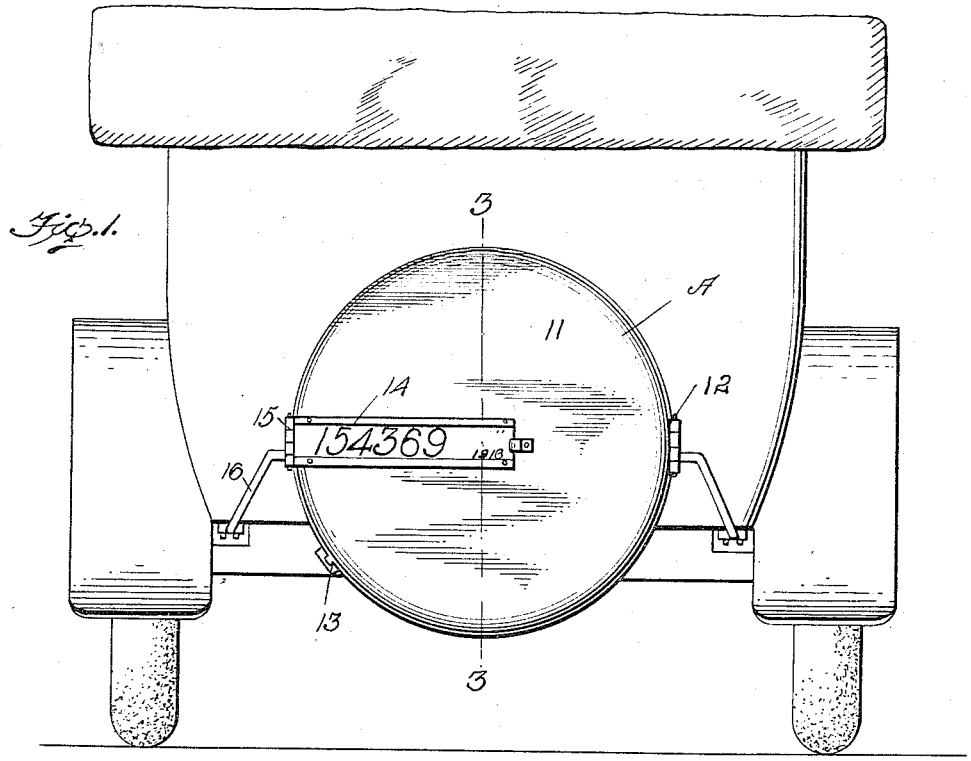
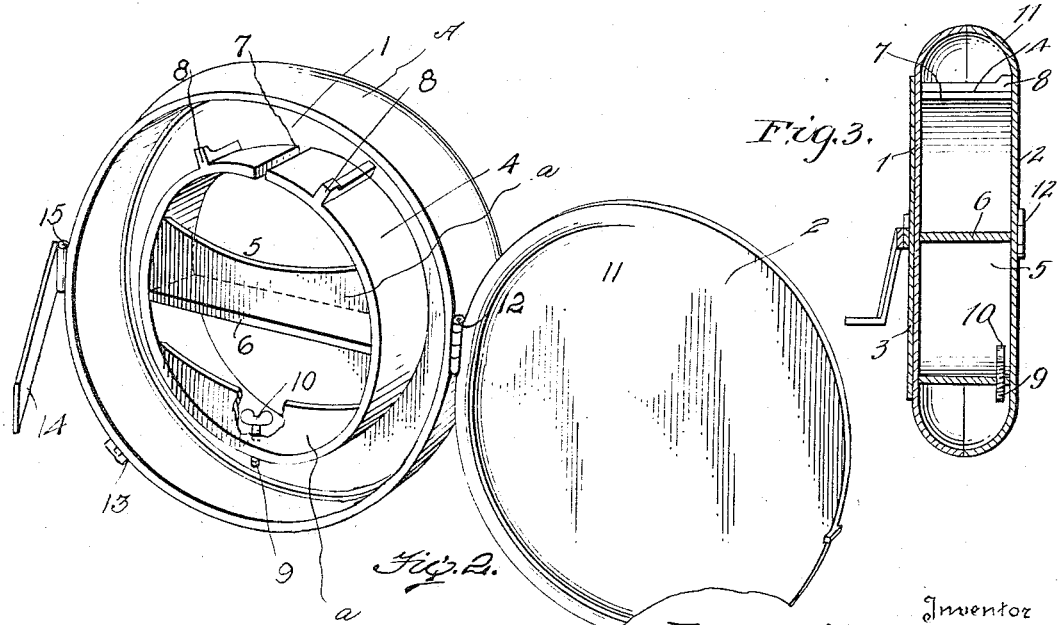

FRANK BROSMAN, OF DES MOINES, IOWA.

TIRE-CARRIER.

1,244,417. Specification of Letters Patent. Patented Oct. 23, 1917.

Application filed September 28, 1916. Serial No. 122,680.

*To all whom it may concern:*

Be it known that I, FRANK BROSMAN, a citizen of the United States, residing at Des Moines, in the county of Polk and State of Iowa, have invented certain useful Improvements in Tire-Carriers, of which the following is a specification, reference being had therein to the accompanying drawing.

The object of my invention is to provide a receptacle of novel construction adapted to be secured to the rear of an automobile for carrying extra tires, and which may also be provided with a compartment for carrying tools, etc., if desired.

The invention consists in the several novel features hereinafter set forth, and more particularly defined by claim at the conclusion hereof.

Reference is to be had to the accompanying drawings, in which like reference characters indicate like parts throughout the several views.

Figure 1 is a rear view of a carrier secured to an automobile, and adapted to receive two extra tires mounted upon demountable rims and provided with compartments for reception of tools.

Fig. 2 is a perspective view showing the open position of such a carrier.

Fig. 3 is a vertical section on the line 3—3 of Fig. 1.

In the embodiment of my invention illustrated in Figs. 1, 2 and 3, the tire carrier is shown in the form of a sectional body A, including the section 1 forming the drum, into which one or more tires, inflated upon rims of any desired construction, will snugly fit, and the section 2 which constitutes a closure for the drum, which latter is preferably formed of light sheet metal, although the same may be made from any other material. The body A is mounted in any suitable manner upon the base 3 of a bracket or other support.

Secured interiorly of the body A in the drum section 1 thereof is an outwardly extending annulus 4 adapted to receive the tire rims over the outer edge of the same, while the space within the annulus forms a tool compartment 5 divided by a partition 6 into upper and lower chambers, the said annulus being formed with front vertical webs *a* made of wood or metal which constitute front walls to the chambers so as to prevent the falling out of the tools or other equipment placed within the chambers when the swinging section 2 of the body A is open for access to the interior thereof.

The annulus 4 has an inwardly extending slot 7 formed therein at its top to accommodate the valve stems upon the tires and is also provided on its outer peripheral surface, at opposite sides of this slot, with ribs constituting racks 8 upon which rest the rims or the tires placed about the annulus 4 for the storage of the same within the body A of the carrier. These ribs 8 are formed at their front or forward ends with enlargements to prevent the tires from slipping off of the same. It will be seen from Fig. 3 that when the cover section is closed it contacts the section 1 and at the same time it contacts with the ribs 8 and the annulus 4. A bolt 9 provided with a winged head 10 upon its inner end is threaded through the annulus 4 at its bottom for holding the lower part of the tires upon their support. The section 2 is convexed at 11 and constitutes the door to the carrier, and is pivoted upon a vertical hinge 12 secured to the front edge of the drum 1 and is also provided with a suitable latch 13 for the locking of the door closed.

A license holder 14 is hinged to the front edge of the drum 1 diametrically opposite the hinge 12, as shown at 15, in such a manner that when the door is closed the license holder for receiving a license tag will fold over the front face of the same into the position shown in Fig. 1 of the drawings, but when it is desired to open the door the license holder 14 will swing back out of the way, as shown in Fig. 2 of the drawings.

The tire carrier as above described is fastened to the rear of the chassis of an automobile by means of a bracket or support, which, in this instance, has the arm 16 secured to the said chassis and the base 3 of said bracket or support has suitably fixed thereto the carrier.

I claim:

In a device of the kind described, in combination, a drum section, an annulus secured to the back wall of said drum and projecting outwardly of the forward edge of the drum, said annulus being formed centrally at its upper portion with an inwardly extending slot, an adjustable screw passing through the lower portion of said annulus diametrically opposite said inwardly extending slot, a pair of ribs formed transversely upon said annulus at opposite sides of said slot, the outer ends of said ribs being curved upwardly to provide retaining means, and a hingedly connected drum section arranged to close the first section and to contact with said upwardly curved portions of said ribs.

In testimony whereof I affix my signature.

FRANK BROSMAN.